Dec. 19, 1939. R. W. JOHNSON 2,183,815
OIL CONTROL DEVICE
Filed Feb. 7, 1938 3 Sheets-Sheet 1
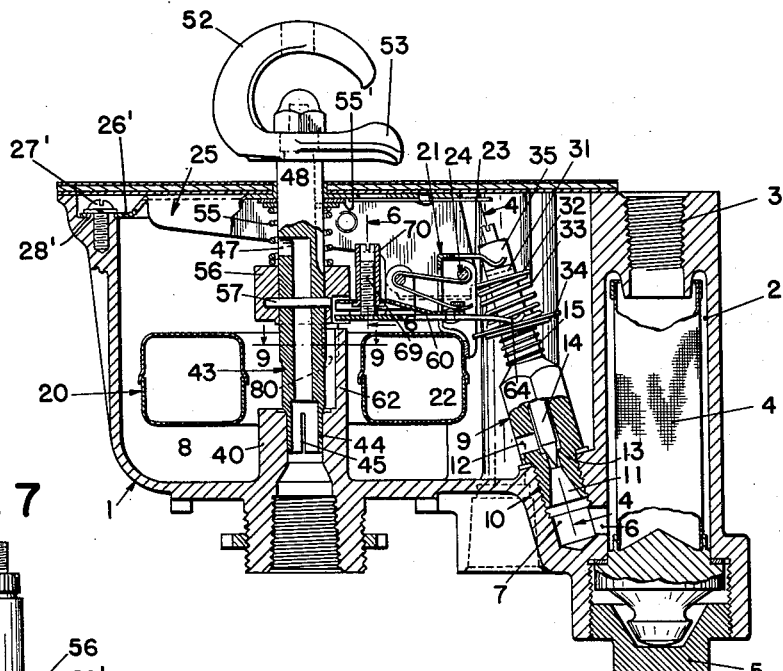
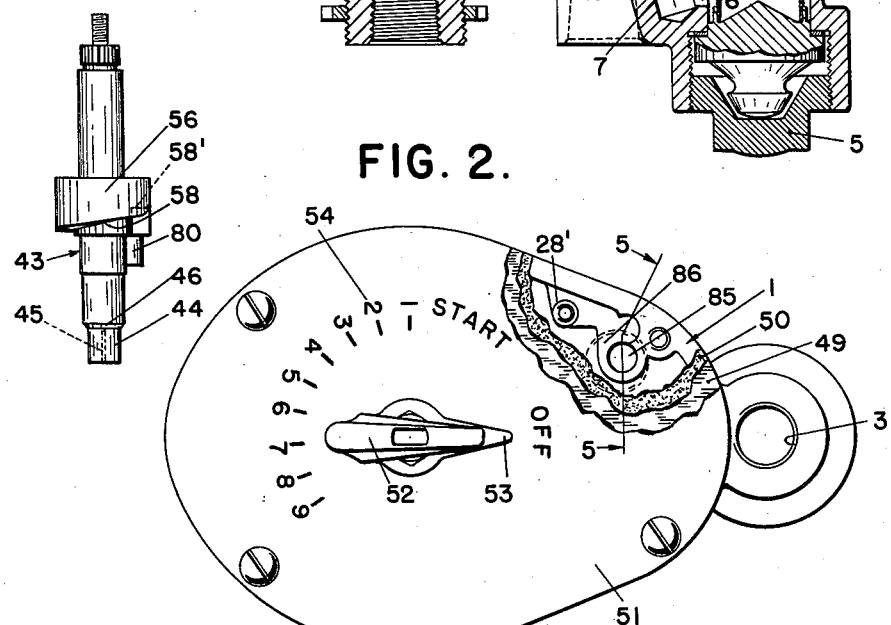
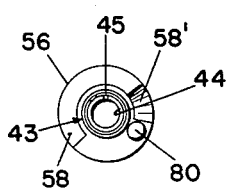
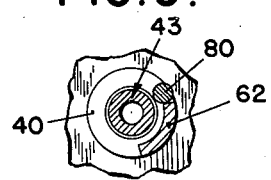
INVENTOR
ROY W. JOHNSON
BY
John W. Michael
ATTORNEY Dec. 19, 1939.    R. W. JOHNSON    2,183,815
OIL CONTROL DEVICE
Filed Feb. 7, 1938    3 Sheets-Sheet 2

INVENTOR
ROY W. JOHNSON
BY
John W. Michael
ATTORNEY

Dec. 19, 1939. R. W. JOHNSON 2,183,815
OIL CONTROL DEVICE
Filed Feb. 7, 1938 3 Sheets-Sheet 3
FIG. 4
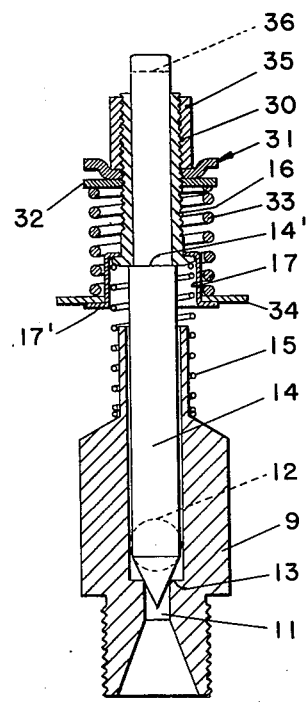
FIG. 10.
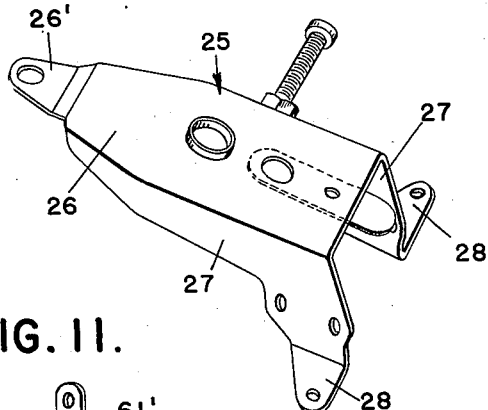
FIG. 11.
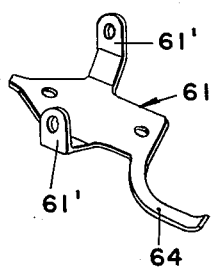
FIG. 13.
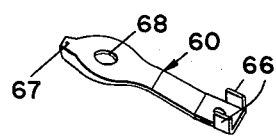
FIG. 12.
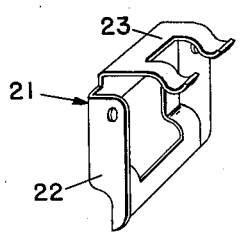
FIG. 14.
FIG. 6.
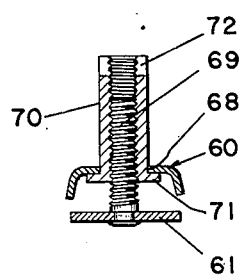
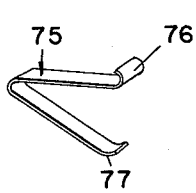
INVENTOR
ROY W. JOHNSON
BY
John W. Michael
ATTORNEY Patented Dec. 19, 1939

2,183,815

UNITED STATES PATENT OFFICE 2,183,815

OIL CONTROL DEVICE

Roy W. Johnson, Milwaukee, Wis.

Application February 7, 1938, Serial No. 189,111

14 Claims. (Cl. 137—68)

This invention relates to an improvement in oil control devices of the type employed between an oil reservoir and an oil burner or oil burning heater to insure flow of oil to the burner under a fixed or constant head.

One of the principal objects of the invention is to provide a control of this character which will function effectively even when subjected to constant vibration or tilting. This feature of the invention renders it capable of advantageous use with small oil burning heaters so extensively used in trailers.

Another important object of the invention is to simplify and compact the construction of a device of this character in such manner as to render it suitable both from the point of view of size and price for use with small oil burning devices and yet maintain the efficiency and reliability and safety of the control in operation.

The present invention contemplates an oil control device of the type comprising a casing having a liquid supply chamber provided with an inlet and an inlet valve regulating the flow of oil into said chamber. Means, such as the float in the chamber, co-acts with the inlet valve to maintain a liquid level in the chamber. The chamber has an outlet with which an outlet valve co-acts to regulate flow therethrough or to shut off flow entirely in its closed position.

The present invention proposes to interlock the outlet and the inlet valve in a special way, so that, with the outlet valve in any of its open positions, the inlet valve will be free to respond to the control of its float or other means which coacts therewith to maintain a level of liquid in the chamber. However, when the outlet valve is fully closed then the interlocking action between the valves forces the inlet valve closed and retains it closed independently of the action of its float so long as the outlet valve remains closed.

The interlocking means between the two valves preferably comprises a lever influenced by a biasing spring to tend to force the inlet valve closed but controlled as to its position and action by the outlet valve.

While various types of devices may be employed for imparting the desired adjustment to the outlet valve the present invention preferably employs a cam means and also proposes to have this cam means control the position of the safety cut-off or interlocking lever between the valves. These features may be employed in a variety of structures of the character contemplated.

For the purpose of compacting and simplifying the construction the several elements which function to maintain the constant level and to control the adjustment of the outlet valve are constructed and organized in a special way. In particular the float which co-acts with the needle valve to maintain a constant level may be in the form of an annulus and the outlet valve extended through the opening of the float. Furthermore, the levers between the valve and between the float of the inlet valve are so closely organized as to take up a minimum of space and as to impose upon the elements employed for mounting them the duty of performing a plurality of functions.

Provision is also made for convenient variation of the liquid lever to be maintained and for convenient low fire adjustment. The latter adjustment may be advantageously provided between the safety cut-off lever and the cam controlling the outlet.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 1 is a view showing an oil control device embodying the present invention with the outlet valve fully closed and the inlet valve punched to closed position by the interlocking means between the valves and illustrating the device in central vertical longitudinal section with parts shown in elevation for the sake of illustration;

Figure 2 is a view in top plan of the device shown in Figure 1, portions of the cover of the device being broken away for the sake of illustration;

Figure 4 is a sectional view taken on line 4—4 of Figure 1;

Figure 6 is a detail sectional view taken on line 6—6 of Figure 1;

Figure 7 is a detail view in elevation of the outlet valve employed in the construction shown;

Figure 8 is a view in bottom plan of the outlet valve shown in Figure 7;

Figure 9 is a detail sectional view taken on line 9—9 of Figure 1;

Figure 10 is a detail perspective view of the mounting bracket employed for the operating mechanism and safety cut-off combined with the inlet valve;

Figure 11 is a similar view of the safety cut-off lever;

Figure 12 is a similar view of the lever interposed between the float and the inlet valve;

Figure 13 is a similar view illustrating the manner in which adjustment means combined with the safety cut-off lever in the construction illustrated regulate low fire adjustment; and Figure 14 is a perspective view of the biasing spring employed for the safety cut-off lever.

Figure 3:
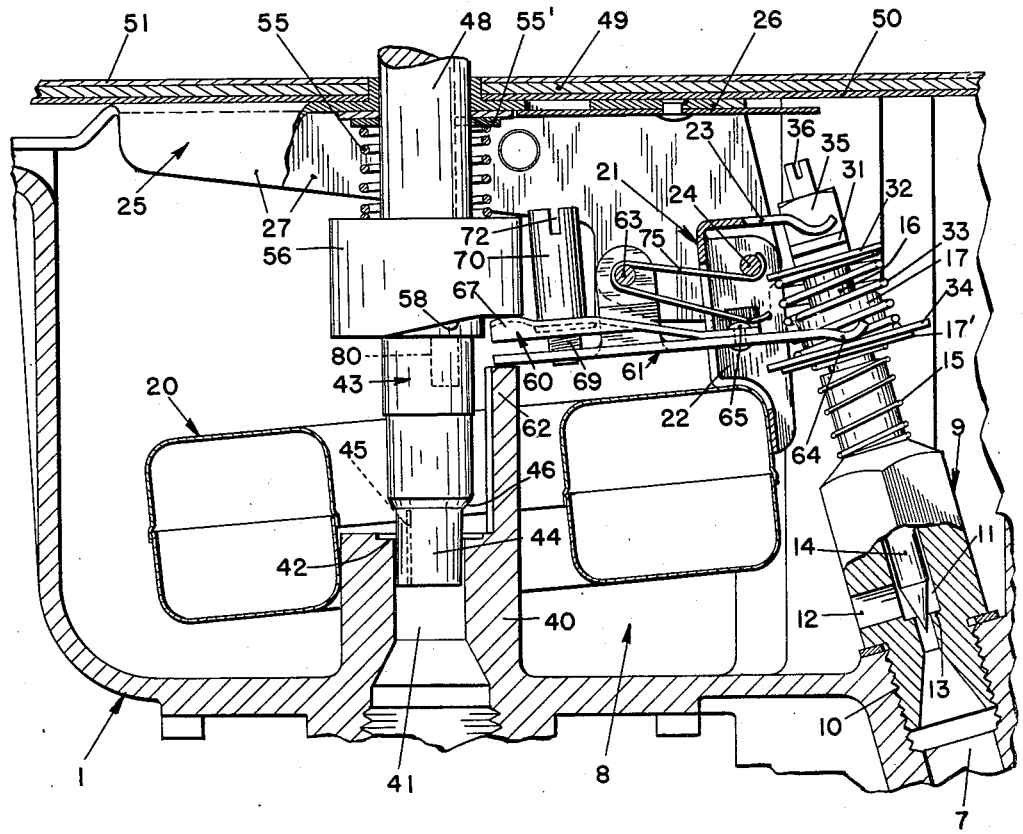
Figure 3 is a view similar to Figure 1 but on an enlarged scale and showing the cam and parts cooperating therewith in elevation with the outlet valve partially open but with the float for the inlet valve dropped down to the position it assumes before liquid is supplied to the liquid supply chamber.

Referring to the drawings, the numeral 1 designates generally the body or casing of the device. While this may be constructed in any suitable manner it is advantageously constituted of an appropriately machined die casting. At one end the casing 1 has a thickened wall provided with a vertical opening or passageway 2, the upper end of which is internally threaded as at 3 to adapt it for connection with a conduit or pipe leading from a reservoir (not shown). A strainer 4 is incorporated in the passageway 2 and may be removed by backing off a large wing nut 5 threadedly interconnected with the casing at the lower end of the passageway 2. As the particular construction of these elements forms no part of the present invention they need only be generally described. Just above its lower end, the passageway 2 communicates through a port or opening 6 with an upwardly extending and inclined inlet passage 7 formed in the bottom of the casing.

The inlet valve may be of any suitable construction and in the embodiment illustrated comprises a valve body 9 threadedly connected as at 10 with the upper end of the inlet passage 7. The valve body 9 is provided with an axial opening 11 which is suitably shaped and communicates at its lower end with the inlet passage 7. A transverse passage or port 12 leads from the axial opening 11 of the valve body and to the interior of the liquid supply chamber. Just below the transverse port 12 the valve body is provided with a valve seat 13. An inlet valve 14 which may be a needle valve has its beveled or pointed lower end cooperable with the valve seat 13 for the purpose of regulating flow of liquid into the liquid supply chamber 8. When the valve 14 is engaged with its seat, flow is shut off and when it is moved away from its seat, liquid is permitted to flow into the liquid supply chamber.

The inlet valve 14 is biased to open position. In the construction shown, a light coil spring 15 encircles the portion of the valve stem which projects above the valve body and has its lower end abutting the top of the valve body and its upper end abutting a suitable shoulder provided on the valve stem and constituted in the present instance by the flanged lower end of a sleeve 16 and a cup 17 receiving the upper end portion of the spring 15 (see Figure 4). The sleeve 16 is a press fit on the valve stem or is otherwise suitably secured thereon and the cup 17 is maintained in engagement with the flanged lower end of the sleeve in a manner which will be hereinafter more fully described. The inlet valve is controlled in its action by a float so that a constant level will be maintained in the liquid supply chamber and in order to realize certain of the objectives of the present invention this float is preferably of special construction and combined in a special way with the inlet valve.

The float, designated at 20, may be in the form of an annulus or of the so-called "doughnut" type and is buoyed up by the liquid in the supply chamber 8. A valve operating lever designated generally at 21 and preferably formed from sheet metal operatively interconnects the float 20 and the needle valve 14. One arm 22 of this float is soldered, brazed, or otherwise suitably secured to an upper edge of the float. The other arm 23 which is bifurcated straddles the stem of the valve and is operatively connected thereto. Adjacent the juncture of the arms 22 and 23 the valve operating lever is fulcrumed by means of a fulcrum pin 24 on a mounting bracket 25 provided therefor within the casing.

The mounting bracket is shown in detail in Figure 10 and has a plate-like top portion 26 horizontally disposed in the assembly and provided with an apertured attaching lug 26' to aid in securing the bracket in position in the casing. Side wings 27 are integral with the top portion 26 and are formed at their lower ends with apertured feet 28 which like the lug 26' rest upon and are secured by screws 27' or the like to suitable seats 28' within the casing.

The operative connection between the arm 23 of the lever 21 and the inlet valve 14 is adjustable to permit of selection or variation of the level to be maintained. To provide such a connection the sleeve 16 which is a pressed fit on the stem of the inlet valve 14 and has its flanged lower end engaged with the shoulder 14' of the valve stem, is also externally threaded as indicated at 30. Freely slidable along the sleeve 16 is a shoulder forming washer or member 31. This washer or member 31 bears on an annular washer 32 which rests on the upper end of a coil spring 33. The lower end of the spring 33 abuts a washer 34 seated against the flange 17' of the cup 17. A nut 35 is threadedly engaged with the sleeve 16 and has its lower end interfitted with and engaging the shoulder forming washer 31.

In the assembly the nut 35, which has flat and plane outer surfaces, is interengaged with the bifurcated end of the arm 23 of the lever 21 so that the nut is held against turning. The upper end of the stem of the needle valve 14 projects above the top of the nut and is provided with a slot 36 to facilitate its manipulation by a screw driver or similar tool. By turning the needle valve 14 relative to its nut 35 the liquid level maintained in the chamber 8 may be varied. This can be accomplished without disassembly of the structure or disturbing its parts except for the adjustment desired. The selected adjustment is maintained by the action of the spring 33 which also serves to secure the washer 34 and cup 17 in proper position.

The bottom of the casing 1 is provided with a cylindrical or tubular formation 40 formed with an outlet passage 41 connected in the conventional fashion to the burner with which the device is employed. Around the upper end of this outlet passage 41 a valve seat 42 is provided.

An outlet valve designated generally at 43 coacts with the outlet passage 41 and valve seat 42 to regulate or shutoff flow of the oil or liquid fuel from the supply chamber 8 to the burner. At least the lower portion of this outlet valve 43 is tubular or hollow in its construction and it has a reduced and tubular lower end 44 fitting for slidable adjustment in the outlet passage 41. A metering slot 45 is provided in the portion 44. At the upper end of the portion 44 the outlet valve is provided with a bevelled surface 46 designed to engage the valve seat 42 and shut off the flow of oil. The tubular formation of the portion of the outlet valve together with a transverse port 47 provided therein above the liquid level to assure proper venting of the valve and the proper flow of liquid fuel. The outlet passage 41 is located below the opening in the float 20 and the outlet valve 43 extends through this opening. The opening in the float 20 is sufficiently larger than the valve 43 and the tubular formation 40 to allow free movements of the float without interference from these parts.

As shown in Figures 1 and 3 of the drawings, the stem 48 of the outlet valve projects up through an opening provided therefor in the cover 49 of the casing. The cover 49 is releasably secured to the top of the casing in liquid tight relation thereto, a gasket 50 sealing the cover to the wall of the casing. The cover may be surmounted by a combination name and index plate 51. Above the top of the casing the outlet valve is provided with a handle or knob 52 to facilitate turning of the valve, and the knob 52 may be provided with a pointer 53 co-acting with suitable indicia 54 provided on the name plate 51 to indicate the position of the outlet valve or the adjustment thereof.

The outlet valve is preferably biased to closed position and its particular adjustment is determined by cam means operable by rotation of the outlet valve or its stem which, as indicated, is effected by turning the knob or handle 52. For these purposes a coil spring 55 encircles the valve stem 48 and has its upper end abutting a washer 55' splined to the valve stem 48 and engaged with the underside of the cover of the casing. The lower end of the spring 55 bears down on the upper side of a collar 56 pinned or otherwise suitably secured to the outlet valve as indicated at 57.

The underside of this collar 56 is provided with an active cam face 58 which takes an active part in adjusting the position of the outlet valve and causes it to regulate or shut off the flow of liquid fuel through the outlet to the burner. The cam thus provided may be the same as or similar to the cam 20 disclosed in my application for "Metering valves" filed June 29, 1936, Serial No. 87,987.

While the cam constituted by the lower cam face of the collar 56 may co-act with any suitable abutment in effecting its control over the outlet valve, the present invention in order to compact the construction, reduce the number of parts required to a minimum, and also embody in the device a safety cut-off feature, preferably has the active cam face 58 bear upon an adjustable abutment 60 of a safety cut-off lever designated generally at 61, the end of the lever 61 underlying the abutment 60, in turn, bearing on an upright or supporting member 62 at all times except when the outlet valve is fully closed. The upright or supporting member 62 may be formed as an integral part of the tubular outlet formation 40.

The lever 61 may be constructed of a single piece of sheet metal as shown in detail in Figure 11. Intermediate its ends the lever 61 is provided with offset and upwardly extending apertured hanger lugs 61' which are fulcrumed on a fulcrum pin 63 supported in suitable openings provided therefor in the side wings of the bracket 25. One arm of the lever is formed with a reduced extension 64 which is positioned in the assembly to bear downwardly on a portion of the washer 34 (see Figures 1 and 3). The adjustable abutment 60 is constructed of spring steel or other resilient metal and one end thereof is riveted as at 65 to the lever 61 and has upstanding lugs 66 on its edges designed to provide a spring seat. The opposite end of the abutment is curved or folded to adapt it for smooth wiping engagement with the active face 58 of the cam. Adjacent the cam engaging end 67 the abutment 60 is provided with an opening 68. A screw 69 (see Figures 1, 3 and 6) has its lower end riveted or otherwise suitably fastened to the lever 61 and extends upwardly therefrom and at right angles thereto, the screw passing through and projecting above the opening 68. An internally threaded sleeve 70 is engaged with the threads of the screw 69 and is provided with a flange 71 at its lower end which engages the underside of the abutment 60 around the margin of its opening 68. The sleeve 70 is rotatable in the opening 68. The upper end of the sleeve 70 is provided with a cross slot 72 to facilitate turning of the sleeve by a screw driver or the like and consequently its axial adjustment along the screw. The initial tension and inherent resiliency of the abutment 60 tends to maintain it flatly engaged with the top side of the lever 61. For appropriately turning the sleeve 70 the abutment 60 may be flexed upwardly away from the lever 61. In this way the proper low fire adjustment is conveniently obtained and regulated with nicety.

A V-shaped spring designated at 75 (see Figures 1, 3 and 14) is provided for biasing the lever 61 to a position wherein it will be effective to force the inlet valve 14 to closed position. The bight of this spring fits snugly about and is supported on the fulcrum pin 63. The curled end 76 of the upper leg of the spring 75 is engaged with the fulcrum pin 24 whereas the curved end 77 of the lower leg of the spring bears down on the rivet 65 in between the lugs 66. The spring 75 is tensioned to accomplish its intended function.

The parts are dimensioned, proportioned, and designed so that in all of the open positions of the outlet valve, the safety cut-off lever 61 has its left hand end as viewed in Figures 1 and 3 bearing on the upper end of the support 62 whereas its extension 64 is spaced from the washer 34. This frees the inlet valve at such time from any control of the safety cut-off lever 61 and leaves it under the sole control of its float 20 which functions to maintain a constant level in the liquid supply chamber. However, when the outlet valve is turned to off position the abutment 60 of the lever 61 comes into registration with a rather deep recess 58' in the active cam face 58 and this allows the spring 75 to rock the lever 61 in a clockwise direction as viewed in Figures 1 and 3 thereby causing the end 64 of the lever 61 to bear downwardly on the washer 34 and punch the inlet valve 14 to closed position.

This interlocking of the outlet and inlet valves in the manner described is a feature of substantial advantage in a device of this character when it is subjected to vibration. If the outlet valve is closed and the device vibrated, as it is in a trailer, the float and its lever, due to their inertia, are apt to repeatedly and momentarily open the inlet passage and if the liquid fuel is not being used the level in the supply chamber may continue to rise above a safe or selected level. This may continue until the device overflows or floods, which is obviously undesirable if not hazardous. In applicant's invention whenever the outlet valve is closed the inlet valve is forcibly held shut and the float no longer controls or changes its position.

The movement of the outlet valve in either direction is limited by means of a stop pin 80 (see Figures 1, 3 and 7 to 9) which depends from the collar 56 and is engageable with either side of the support 62 to limit the turning movement of the valve.

Figure 5:
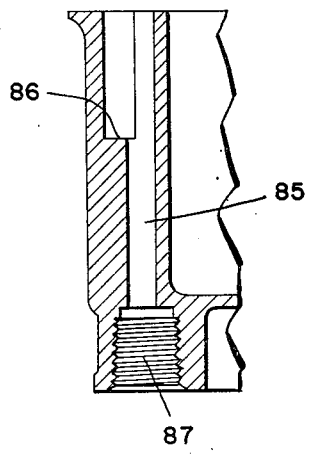
Figure 5 is a view in vertical section taken on line 5—5 of Figure 2.

The device may be conveniently provided with an overflow passage 85 (see Figures 2 and 5) opening above a dam 86 at its upper end and provided at its lower end with internal threads 87 adapted to be connected to a suitable overflow pipe (not shown). When used on a trailer the overflow pipe may be led to the exterior or any suitable point of discharge.

In addition to the advantages realized from interlocking the valves in the manner described the device is so closely organized and so simplified as to substantially improve its capacity for its intended use, that is, it is well adapted both from the aspect of size and price for use with small oil burning devices and yet it accurately meters small amounts of oil and is otherwise positively reliable and safe in operation.

By having the inlet valve body and valve inclined the inlet valve tends to seat in the same fashion each time it is closed and this has the effect of improving its action. Furthermore, this relation of the inlet valve to the other elements of the structure decreases the necessary overall length of the valve and simplifies the drilling operations required.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. An oil control device of the character described comprising a casing having a liquid supply chamber provided with an inlet, an inlet valve regulating flow through said inlet, a float in said chamber and cooperable with said inlet valve to maintain a constant level in said chamber, said chamber having an outlet, an outlet valve regulating flow through said outlet and operable to shut off flow therethrough in its closed position, and means controlled by the outlet valve and cooperable with the inlet valve to close the inlet valve independently of the action of its float when the outlet valve is moved to closed position.

2. An oil control device of the character described comprising a casing having a liquid supply chamber provided with an inlet, a float controlled inlet valve cooperable with said inlet to maintain a constant level in said supply chamber, said chamber having an outlet, an outlet valve regulating flow through the outlet and operable to shut off flow therethrough in its closed position, and a safety cut-off lever controlled by said outlet valve and cooperable with the inlet valve to force the same to closed position when the outlet valve is closed.

3. An oil control device of the character described comprising a casing having a liquid supply chamber provided with an inlet, a float controlled inlet valve cooperable with the inlet to maintain a constant level in said supply chamber, said supply chamber having an outlet, an outlet valve cooperable with said outlet, cam means for controlling the position of the outlet valve to cause it to regulate or shut off flow of liquid through said outlet, and a lever controlled in its position by said cam means and co-acting with the inlet valve to force the same to closed position when the outlet valve is closed.

4. An oil control device of the character described comprising a casing having a liquid supply chamber provided with an inlet, a float controlled inlet valve cooperable with the inlet to maintain a constant level in said supply chamber, said supply chamber having an outlet, an outlet valve cooperable with said outlet, cam means for controlling the position of the outlet valve to cause it to regulate or shut off flow of liquid through said outlet, a safety cut-off lever having an arm adapted to co-act with the inlet valve, and means for biasing the lever to a position wherein it is effective to close said inlet valve, said lever also having an arm cooperable with said cam means, said cam means being designed to maintain the lever out of controlling relation with the inlet valve in all open positions of the outlet valve and freeing the lever for response to the action of its biasing means when the outlet valve is closed.

5. An oil control device of the character described comprising a casing having a liquid supply chamber provided with an inlet, a float controlled inlet valve cooperable with the inlet to maintain a constant level in said supply chamber, said supply chamber having an outlet, an outlet valve cooperable with said outlet, cam means for controlling the position of the outlet valve to cause it to regulate or shut off flow of liquid through said outlet, a safety cut-off lever fulcrumed in said casing and having one end adapted to co-act with said inlet valve and its other end cooperable with said cam means, and a spring for biasing said lever to a position wherein it is effective to force said inlet valve to closed position, said cam means being designed to maintain the lever out of controlling relation with the inlet valve in all open positions of the outlet valve and freeing the lever to respond to the action of its biasing spring in the closed position of the outlet valve.

6. An oil control device of the character described comprising a casing having a liquid supply chamber provided with an inlet, a float controlled inlet valve cooperable with said inlet to maintain a constant level of liquid in said supply chamber, said supply chamber having an outlet, an outlet valve cooperable with said outlet, said outlet valve having a stem, a cam fixed to the stem and effective upon rotation thereof to regulate the position of the outlet valve, and a safety cut-off lever fulcrumed in said casing, cooperable with said inlet valve and engaged with and controlled as to its position by said cam.

7. An oil control device of the character described comprising means providing a liquid supply chamber, an inlet valve regulating the flow of liquid into said chamber, means controlling said valve to maintain a liquid level in said chamber, there being an outlet from said chamber, an outlet valve regulating flow of liquid through the outlet and operable to shut off flow therethrough in its closed position, and means controlled by the outlet valve and cooperable with the inlet valve to force the inlet valve closed when the outlet valve is closed.

8. An oil control device of the character described comprising a casing having a liquid supply chamber provided with an inlet, an inlet valve regulating flow through the inlet, means controlling said valve to maintain a liquid lever in said chamber, there being an outlet from said chamber, an outlet valve regulating flow of liquid through the outlet and operable to shut off flow thereof in its closed position, said outlet valve having a stem, a cam fixed to said stem, a lever fulcrumed within the casing and having an arm engaged with the cam and having another arm cooperable with the inlet valve, spring means for biasing the lever to a position to force the inlet valve closed, an abutment in the casing engageable with the arm of the lever cooperable with the cam and conjointly operating therewith to effect adjustment of the outlet valve as the stem and cam are turned, spring means tending to close the outlet valve, said cam having its active face so formed as to permit closure of the outlet valve and free said valve in one angular adjustment of the stem and cam to allow said lever to respond to the action of its biasing spring and force the inlet valve closed.

9. An oil control device of the character described comprising means providing a liquid supply chamber, an inlet valve regulating the flow of liquid into said chamber, means controlling said valve to maintain a liquid level in said chamber, and having an outlet from said chamber, an outlet valve regulating flow of liquid through the outlet and operable to shut off flow therethrough in its closed position, said outlet valve having a stem, a spring co-acting with the outlet valve to bias it to closed position, a cam fixed to said stem, a lever fulcrumed in the casing and having an arm cooperable with the inlet valve and an arm adjacent the cam, an adjustable member secured to said last mentioned arm and engageable with the active face of the cam, an abutment in the casing engageable with said last mentioned arm on the opposite side thereof from said member, and means for turning said stem.

10. An oil control device of the character described comprising a casing having a liquid supply chamber provided with an inlet, an inlet valve regulating flow through the inlet, a float in said liquid supply chamber, a valve operating lever connecting said float and said inlet valve and having a slot, said liquid supply chamber having an outlet, an outlet valve regulating flow through the outlet, cam means for controlling the position of the outlet valve and a safety cutoff lever fulcrumed in the casing and having an arm engaged with the cam means and an arm extending through the slot of said first mentioned lever and cooperable with the inlet valve and effective when the cam means is operated to close the outlet valve to force the inlet valve to closed position.

11. An oil control device of the character described comprising a casing having a liquid supply chamber provided with an inlet, an inlet valve cooperable with the inlet to regulate flow therethrough, a float in said chamber, a lever fulcrumed in the casing and interconnecting the float and the inlet valve, said float being in the form of an annulus, said casing having an outlet alined with the opening of said annular float, an outlet valve extending through the opening of the float and cooperable with the outlet to regulate flow therethrough, means for regulating the position of the outlet valve, and a safety cut-off lever fulcrumed in said casing, controlled as to its position by the outlet valve and engageable with the inlet valve to force it to closed position when the outlet valve is closed.

12. An oil control device of the character described comprising a casing having a liquid supply chamber provided with an inlet, said chamber having an inclined inlet passage, an inlet valve combined with the passage to regulate flow of liquid therethrough, said inlet valve inclining inwardly toward the center of said chamber, a float in said chamber and cooperable with said valve to maintain a liquid level therein, said float being in the form of an annulus, said chamber having an outlet below and alined with the opening of the float, an outlet valve extending through the opening of the float and cooperable with the outlet to regulate flow therethrough, and a safety cut-off lever disposed above said float and interlocking said valves.

13. An oil control device of the character described comprising a casing having a liquid supply chamber provided with an inlet, an inlet valve regulating flow through the inlet, a float in said liquid supply chamber, a valve operating lever connecting said float and said inlet valve and having a slot, said liquid supply chamber having an outlet, an outlet valve regulating flow through the outlet, cam means for controlling the position of the outlet valve, a safety cut-off lever fulcrumed in the casing and having an arm engaged with the cam means and an arm extending through the slot of said first mentioned lever and cooperable with the inlet valve, and a spring co-acting with the fulcra of both of said levers and engaged with the safety cut-off lever and effective when the cam means closes the outlet valve to force the inlet valve closed.

14. An oil control device of the character described comprising a casing having a liquid supply chamber provided with an inlet, an inlet valve for regulating flow of liquid to said supply chamber, said inlet valve inclining toward the center of said chamber, a float in said chamber and cooperable with said valve to maintain a liquid level therein, said float having an opening therethrough, said chamber having an outlet below and alined with the opening of the float, an outlet valve extending through the opening of the float and cooperable with the outlet to regulate flow therethrough, means operable from the exterior of the casing for closing said outlet valve and means for forcing the inlet valve to closed position automatically when the outlet valve is closed.

ROY W. JOHNSON.